United States Patent [19]

Splett et al.

[11] Patent Number: 4,691,126
[45] Date of Patent: Sep. 1, 1987

[54] REDUNDANT SYNCHRONOUS CLOCK SYSTEM

[75] Inventors: Katherine A. Splett; James A. Howe, both of Burnsville, Minn.

[73] Assignee: Sperry Corporation, Blue Bell, Pa.

[21] Appl. No.: 770,461

[22] Filed: Aug. 29, 1985

[51] Int. Cl.⁴ .................. H03K 1/00; H03K 17/02
[52] U.S. Cl. ................... 307/441; 307/480; 307/269; 307/219; 328/63
[58] Field of Search ........... 307/441, 480, 525, 527, 307/269, 219; 328/63, 72, 109

[56] References Cited

U.S. PATENT DOCUMENTS

| | | | |
|---|---|---|---|
| 3,628,158 | 12/1971 | Sjoquist | 328/71 |
| 3,725,793 | 4/1973 | Phillips | 328/63 |
| 4,239,982 | 12/1980 | Smith et al. | 307/219 |

Primary Examiner—Stanley D. Miller
Assistant Examiner—Richard Roseen
Attorney, Agent, or Firm—Glenn W. Bowen; Laurence J. Marhoefer

[57] ABSTRACT

A synchronous clock circuit is provided on each module of an electronic digital system formed of a plurality of modules. Each clock circuit has two control pins which are used by control logic to determine whether or not the clock on a particular module is disabled, is operating as the master clock for the system, or is providing a backup function for the master clock. The common clock line is supplied through a buffer to the components on the module which require clocking. Logic circuitry on the backup clock mode insures the backup clock is in a ready condition in case there should be either failure of the master clock oscillator or if the master clock module is removed from the unit. All of the clock circuits of the different modules may be constructed in an identical manner, with the control of the function of the circuitry being provided simply by control of the logic level on the two terminals. A clock detecting time-out circuit is provided on each of the modules, which has a timing period which is slightly longer than the clock period. If the master clock fails to produce a clock pulse at the time that it should, the clock detect timing circuit, which is coupled to the buffer of the backup module, will sense that a failure has occurred and will control the turn-on of the clock circuit for the backup module.

10 Claims, 1 Drawing Figure

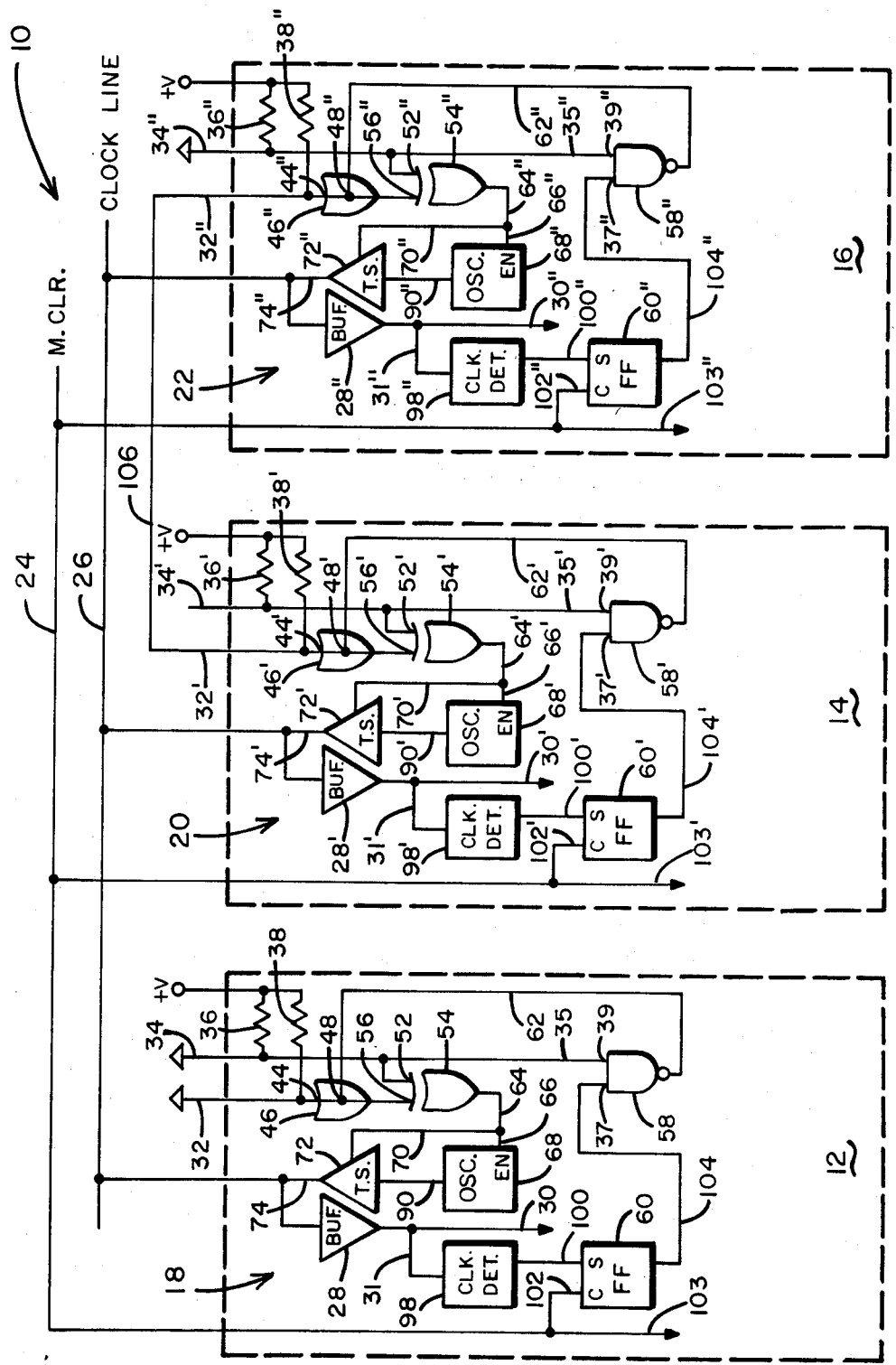

REDUNDANT SYNCHRONOUS CLOCK SYSTEM

BACKGROUND OF THE INVENTION

Electronic digital systems are commonly constructed with a number of separate modules that are supplied by a single synchronous master clock. Many newer system architectures are configured around a basic set of standard complex modules. These standard modules are combined in different ways to meet specific system objectives (e.g., one system may have only one processor, while another may have many processors performing different tasks. While it is possible to generate the clock on a separate clock module, this would require the utilization of a module slot in the chassis simply for the clock.

A single synchronous clock is an essential feature in many electronic digital systems. Such a system may consist of few modules, (e.g., a processor with a memory module and an input/output module) or it may consist of many modules. In a multiple module electronic system, it is highly desirable to be able to remove any module in the system and to have the system to continue to operate, and a single clock source would obviously not meet this limitation. Another requirement for many implementations is that the number of back panel pins employed must be minimized. The present invention provides a redundant clock system consisting of two clock circuits each of which may be activated which require only two pins for control. Other modules may also contain clock circuits that are disabled in systems where they are not required.

SUMMARY OF THE INVENTION

The clock system of the present invention provides a separate clock source on each of a number of modules, one of which is designated as a master clock, and one other of which may be designated as a backup clock. Logic on the module with the backup clock monitors the system bus clock line and if a missing clock pulse is detected, it disables the master clock and enables the backup clock onto the bus. This system is implemented in the present invention by utilizing only one more pin than would be required to simply disable the master clock. The backup clock also is able to take over if the module containing the master clock is removed from the circuit.

BRIEF DESCRIPTION OF THE DRAWING

The invention is described by reference to the FIGURE which is a schematic illustration of the present invention which has a master clock module, a backup clock module and a module with a disabled clock.

DESCRIPTION OF THE INVENTION

A digital logic system 10 that employs the redundant synchronous clock system of the present invention consists of three modules 12, 14 and 16 which may be identical or of different types. These modules contain circuitry for the digital logic system, but since this circuitry is not of importance to the present invention, only the clock circuitry portions of the modules are illustrated. Each of the modules 12, 14 and 16 preferably contains an identical clock circuit 18, 20 and 22, respectively.

A master clear line 24 coupled to all of the clock circuits, 18, 20 and 22, is energized when the power is turned on, or at other times whenever a master clear signal is required for the digital logic system. The outputs of each of the clock circuits 18, 20 and 22 are coupled to a common clock line 26. In the illustrated embodiment of the FIGURE, the clock circuit 18 on the module 12 is disabled. For this embodiment the necessary clocking for the digital logic circuitry on the module 12 is supplied by the common clock line 26 through a buffer 28 to the line 30, which supplies the clock signals as required by the logic circuitry (not shown) on the module 12. The clock circuit 18 has two logic level input terminals 32, 34, both of which are permanently connected to ground to supply a LOW level input. A pair of resistors 36, 38 are connected at one end to the terminals 32, 34, respectively, and at their other end to a positive voltage supply terminal 40. The LOW logic level from the terminal 32 is coupled to the input 44 of a Collector-OR gate 46. The terminal 48 of the Collector-OR gate 46 is connected to the output of a two-input open-collector NAND gate 58 at the lower end of the resistor 38. The terminal 34 is directly coupled to the input 52 of the Exclusive-OR gate 54, while its other input 56 is connected to the output of the Collector-OR gate 46.

The grounded terminal 34 is also coupled on the line 35 to the input terminal 39 of a two-terminal open-collector NAND gate 58, disabling the NAND gate. The other input 37 of the gate 58 is coupled to the set output of a flip-flop 60. The terminal 56 will be at a LOW level, and the Exclusive-OR 54 supplies a LOW level on the line 64, which is connected to an Enable terminal 66 of an oscillator 68. A LOW logic level on the terminal 66 disables the oscillator 68. The signal on the line 64 is also supplied on the line 70 to turn-off a tri-state clock driver 72 simultaneously with the disabling of the oscillator 68. The oscillator 68 and the driver 72 are constructed to provide an accurate repetitive square-wave clock signal when the oscillator is enabled and the driver is turned-on. The driver 72 acts as an output amplifier and a buffer to supply the clock signal output of the oscillator 68 to the line 74 as long as the oscillator and the driver are enabled via the line 64.

The buffer 28 has an input coupled to receive the clock signal on the common clock line 26, and an output coupled to a clock detect circuit 98 via the line 31. The clock detect circuit is a timing circuit, such as a one-shot multivibrator, that has a longer time-out period than the timing period that exists between normal clock pulses. The output of the clock detect circuit 98 is coupled on the line 100 to the S, or set, input terminal of a flip-flop 60. The C, or clear, input terminal of the flip-flop 60 is coupled to a line 102 which is connected to the master clear line 24 via line 103. The clear signal may also be supplied to other circuitry on the module over the line 103.

Upon energization of power to the system, the flip-flop 60 will be initially cleared and will, therefore, supply a LOW level on the line 104, to the input 37 of the NAND gate 58, the other input 39 of which is a permanent LOW level grounded signal from the 34. If for some reason a clock pulse is missing in the train of clock pulses that are supplied on the clock line 26, the clock detect circuit 98 will time-out, and will provide a HIGH level on the line 100 to the set terminal of the flip-flop 60, and the flip-flop 60 will then output a HIGH level signal on the line 104 to the input 37. However, the other input 39 of the NAND gate 58 is permanently connected to the grounded terminal 34, and there will be no change in the state of the NAND gate 58, despite the fact that the clock detect circuit 98 has detected a missing clock pulse.

The module 14 contains the backup clock circuit 20 which is constructed with the same components as the clock circuit 18 of the module 12 and the master clock circuit 20 of the module 16. For this reason, the same element numbers used to describe the clock circuit 18 are primed and employed to describe the clock circuit 20, while the element numbers of the master clock circuit 22 are double primed. The input terminal 34' of the backup clock circuit 20 is left with an open connection instead of being connected to ground, as is the terminal 34, while the terminal 32' is connected to the corresponding terminal 32" of the master clock circuit 22 on the module 16. The terminal 34" of the master clock circuit 22 is connected to ground, so that aside from the fact that the terminal 32" is connected to the terminal 32' through the interconnecting line 106, the master clock circuit 22 is identical to the disabled clock circuit 18 of module 12.

In normal operation the master clock circuit 22 will supply the system clock to the clock line 26. The flip-flop 60" of the master clock circuit 22, having been initially cleared by a master clear signal on the line 24, will supply a LOW logic level signal on the line 104" to input 37" of the NAND gate 58". The output of the NAND gate 58" then supplies a HIGH level on the line 62", and the Collector-OR gate 46" will supply a HIGH logic level signal to the input 56" of the Exclusive-OR gate 54" of the module 16. With a LOW level on the input 52" and a HIGH level on the terminal 56" of the Exclusive-OR gate 54", the clock oscillator 68" and the driver 72" will be enabled by a HIGH level on the line 64" and the driver 72" will supply the system clock signal to the line 74" and the common clock line 26. The master clock circuit 22 will be in this operating condition, either following the power-up master clear signal on the line 24, or when the module 14 and its clock circuit 20 is removed from its module slot. Therefore the master clock circuit 22 will supply the default system clock whether or not the module 14 is in its module slot.

The terminal 32' is connected to the terminal 32" through the interconnecting line 106, and, therefore, the initial clearing of the flip-flop 60' of the backup clock circuit 20 provides a LOW logic level signal on the line 104' to the input 37' of the open-collector NAND gate 58'. However, because the terminal 34' is open, a HIGH level is supplied to the other input 39' of the gate 58', thus allowing the gate to pass through the inverted state of flip-flop 60'. With the output of the NAND gate 58' at a HIGH level, the output of the Exclusive-OR gate 54' will then be at a LOW level and the oscillator 68' and driver 72' will thus be disabled.

The clock detection circuit 98' controls its time-out upon the receipt of each clock pulse on the line 26. Thus, if the circuit 98' times out before another clock pulse is received, it means that at least one clock pulse was missing. If this occurs either due to failure of the master clock 22 or to removal of the module 16, the output of the clock detection circuit 98' will supply a HIGH level on the line 100' to set the flip-flop 60'. This causes a HIGH level to be placed on the line 104' to the input 37' of the NAND gate 58'. Since the other input of the NAND gate 58' of the module 14 coupled on the line 35' from the open terminal 34' is permanently at a HIGH level, the input 56' of the Exclusive-OR gate 54' will go to a LOW level and the output of the Exclusive-OR gate 54' will then provide a HIGH level on the line 64' that enables the oscillator 68' on the module 14 as the backup clock so that it rather than the master clock 22 will supply the system clock to the common clock line 26. The LOW level on line 62', due to gate 58' going LOW, will also drive pins 32' and 32" LOW, which will in turn drive pin 56" of Exclusive-OR gate 54" LOW. Pin 52" of gate 54" is already at a LOW level due to the ground on pin 34"', so the output of gate 54" on line 64", will then go LOW disabling the oscillator 68" and driver 72".

What is claimed is:

1. A redundant clock system for an electronic digital logic system that has a common clock bus and is implemented with a plurality of digital clock circuits located on separate modules of said digital logic system comprising at least first and second modules, first and second alternately activatable clock generating means located on said first and second modules, coupled to supply a train of clock pulses to said clock bus from the activated one of said first and second clock generating means, wherein said first clock generating means is initially activated and said second clock generating means is initially deactivated, timing means located on said second module coupled to monitor the clock pulse pulses supplied on said clock bus by said first clock generating means to control a time-out period upon the occurrence of each clock pulse on said clock bus supplied by said first clock generating means and to supply a time-out signal when the interval after a monitored clock pulse exceeds a predetermined time interval and control means coupled to said timing means and constructed to maintain said first clock generator means in an activated state and said second clock generator means in a deactivated state until such time that said timing means has transmitted a time-out signal and to then switch said second clock generator means to an activated state and said first clock generating means to a deactivated state.

2. A redundant clock system as claimed in claim 1 wherein said clock circuits are identical on all modules of said digital logic system and said control means is coupled to deactivate said clock generator means on said first module when said clock generator means on said second module is switched to an activated state.

3. A redundant clock system as claimed in claim 1 wherein said clock circuits are identical on all modules of the system and said clock generator means on said second module is switched to an activated state when the module containing said first clock generator means is removed from said digital logic system.

4. A redundant clock system as claimed in claim 1 wherein said clock circuits are identical on all modules of the system and said control means on all of said modules are coupled to first and second control terminals and one of said control terminals on said first module is interconnected with one of said control terminals on said second module and the other said control terminals of said first module is at a first logic level while the other of said control terminals of said second module is at a second logic level.

5. A redundant clock system as claimed in claim 1 wherein said clock circuits are identical on all modules of the system, and each of said modules each comprises a clock terminal which is coupled to said clock bus and to said clock generator means and said control means on each of said modules.

6. A redundant clock system as claimed in claim 1 wherein said clock circuits are identical on all modules of the system and all of said modules have a common reset terminal which is coupled to said control means.

7. A redundant clock system as claimed in claim 4 wherein said clock circuits are identical on all modules of the system and said modules each comprise a clock terminal which is coupled to said clock bus and to said clock generator means and said control means on said module.

8. A redundant clock system as claimed in claim 7 wherein said clock circuits are identical on all modules of the system and all of said modules have a common reset terminal which is coupled to said control means.

9. A redundant clock system as claimed in claim 8 wherein said clock circuits are identical on all modules of said digital logic system and said control means is coupled to deactivate said clock generator means on said first module when said clock generator means on said second module is switched to an activated state.

10. A redundant clock system is claimed in claim 8 wherein said clock circuits are identical on all modules of the system and said clock generator means on said second module is switched to an activated state when the module containing said first clock generator means is removed from said digital logic system.

* * * * *